US012784557B2

(12) United States Patent
Traugott-Olsen

(10) Patent No.: US 12,784,557 B2
(45) Date of Patent: Nov. 3, 2026

(54) THEFT ALARM LOCKING UNIT DEVICE

(71) Applicant: Anton Traugott-Olsen, Cornell, IL (US)

(72) Inventor: Anton Traugott-Olsen, Cornell, IL (US)

( * ) Notice: Subject to any disclaimer, the term of this patent is extended or adjusted under 35 U.S.C. 154(b) by 283 days.

(21) Appl. No.: 18/538,073

(22) Filed: Dec. 13, 2023

(65) Prior Publication Data

US 2025/0201091 A1 Jun. 19, 2025

(51) Int. Cl.
*G08B 13/12* (2006.01)
*G08B 3/00* (2006.01)

(52) U.S. Cl.
CPC ................ *G08B 13/12* (2013.01); *G08B 3/00* (2013.01)

(58) Field of Classification Search
CPC ...................................................... G08B 13/12
USPC ...................................................... 340/568.2
See application file for complete search history.

(56) References Cited

U.S. PATENT DOCUMENTS 4,291,557 A 9/1981 Bulle
6,100,802 A * 8/2000 Adams .................. E05B 45/005 70/DIG. 49
7,659,817 B2 * 2/2010 Conti ................. G08B 13/2434 70/57.1
7,679,521 B1 * 3/2010 Gavia ...................... G08B 1/08 169/61
D686,485 S 7/2013 Taylor
9,013,301 B2 4/2015 Williams
9,260,885 B2 2/2016 Asquith
9,830,759 B2 11/2017 Hilton
10,654,537 B2 5/2020 Johnson
2002/0113704 A1 * 8/2002 Hess .................. G08B 13/1445 340/568.2
2008/0236209 A1 * 10/2008 Conti ................. G08B 13/1463 70/57.1
2011/0080287 A1 * 4/2011 Oehlert .............. G08B 13/1445 340/571
2012/0299755 A1 * 11/2012 Jones .................... E05B 45/005 340/990
2015/0204112 A1 7/2015 Salzmann
2020/0079323 A1 * 3/2020 Saez .................. G08B 13/1436

FOREIGN PATENT DOCUMENTS

WO WO2017041097 3/2017

* cited by examiner

*Primary Examiner* — Travis R Hunnings

(57) ABSTRACT

A theft alarm locking unit device includes a personal electronic device in wireless communication with an extrinsic communication network. A locking unit is included which comprises a first cable and a second cable each attached to a housing and a lock attached to the first cable. The second cable is releasably attachable to the lock such that the locking unit forms a closed loop for securing a personal belonging to an immovable structure thereby protecting the personal belonging from theft. An alarm unit is integrated into the housing and the alarm unit is triggered when the second cable is forcibly removed from the lock to audibly alert an owner that the personal belonging is in danger of being stolen. The alarm unit is in remote communication with the personal electronic device to notify the owner of the potential theft when the owner is not near the alarm unit.

17 Claims, 8 Drawing Sheets

THEFT ALARM LOCKING UNIT DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to theft alarm devices and more particularly pertains to a new theft alarm device for inhibiting the theft of a personal belonging. The device includes a locking unit which includes a first cable and a second cable each attached to a housing and a lock attached to the first cable. The second cable is releasably attachable to the lock for securing a personal belonging to an immovable structure. The device includes an alarm unit that is in remote communication with a personal electronic device and which is triggered to alert the personal electronic device when the first cable is forcibly removed from the lock.

(2) Description of Related Art Including Information Disclosed Under 37 CFR 1.97 and 1.98

The prior art relates to theft alarm devices including a variety of trailer lock devices that each attaches to a vehicle and broadcasts and alert signal when the vehicle is moved and a variety of electronic lock devices that each includes a housing and a member that attaches to the housing to form a closed loop and an alarm unit integrated into the housing that emits an alarm when the member is forcibly removed from the housing. In no instance does the prior art disclose an electronic lock that includes a housing and a first cable attached to the housing and a second cable attached to the housing and a lock attached to the first cable such that the second cable is attachable to the lock to form a closed loop and an alarm unit integrated into the housing which emits an alarm when the second cable is forcibly removed from the lock.

BRIEF SUMMARY OF THE INVENTION

An embodiment of the disclosure meets the needs presented above by generally comprising a personal electronic device in wireless communication with an extrinsic communication network. A locking unit is included which comprises a first cable and a second cable each attached to a housing and a lock attached to the first cable. The second cable is releasably attachable to the lock such that the locking unit forms a closed loop for securing a personal belonging to an immovable structure thereby protecting the personal belonging from theft. An alarm unit is integrated into the housing and the alarm unit is triggered when the second cable is forcibly removed from the lock to audibly alert an owner that the personal belonging is in danger of being stolen. The alarm unit is in remote communication with the personal electronic device to notify the owner of the potential theft when the owner is not near the alarm unit.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
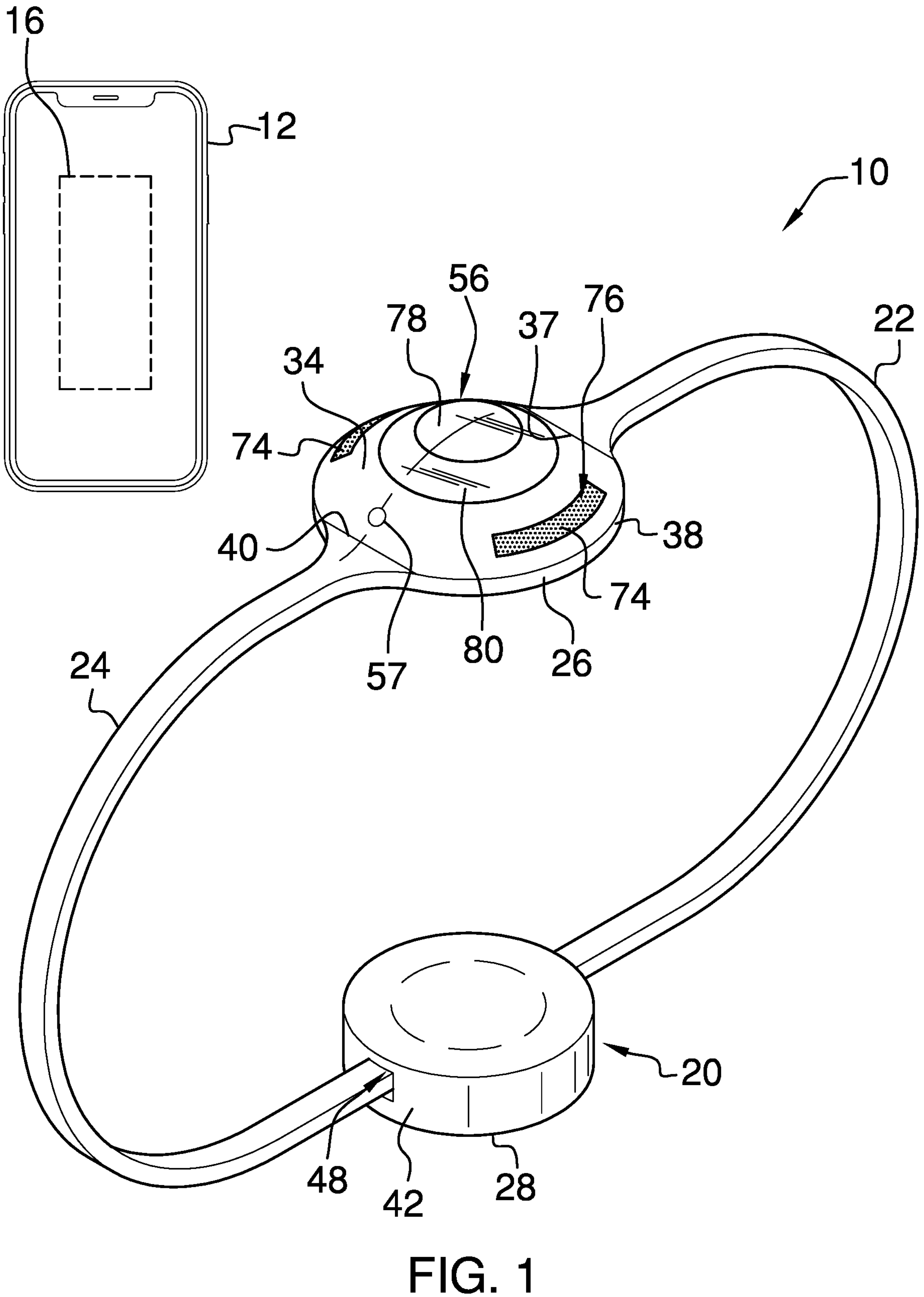
FIG. 1 is a top perspective view of a theft alarm locking unit device according to an embodiment of the disclosure.
Figure 2:
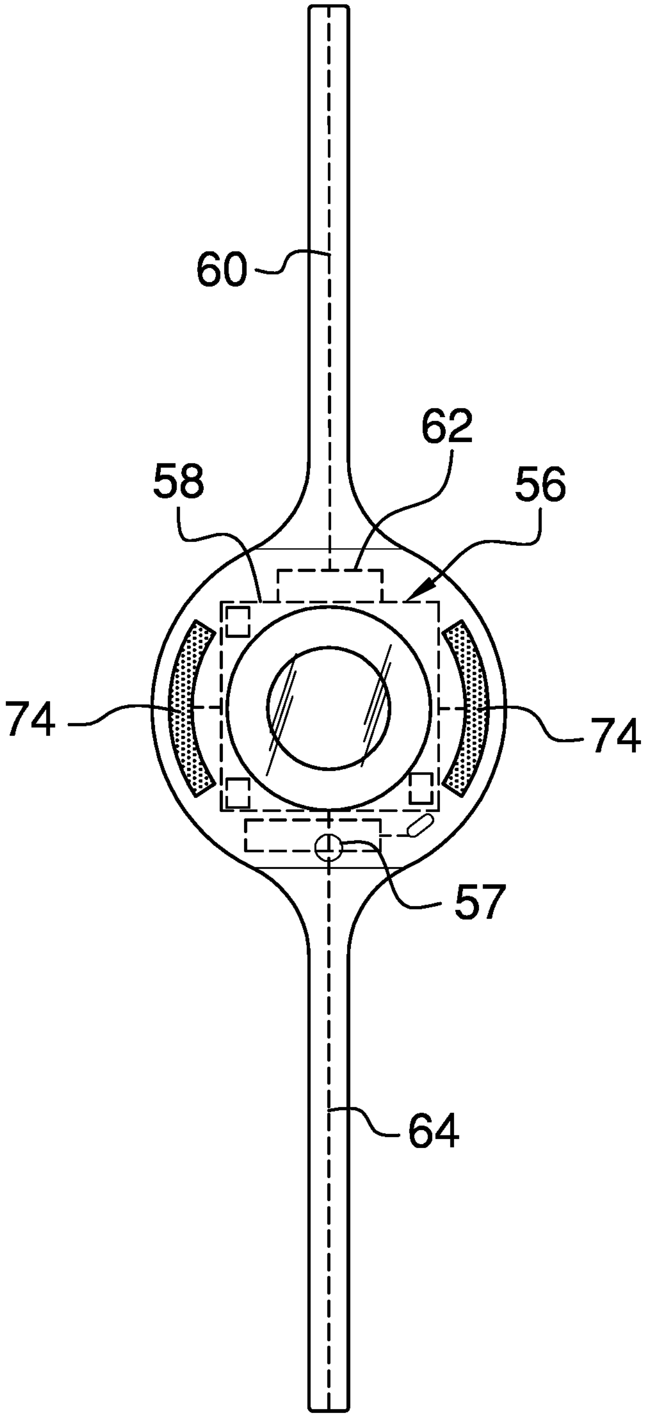
FIG. 2 is a top phantom view of an embodiment of the disclosure.
Figure 3:
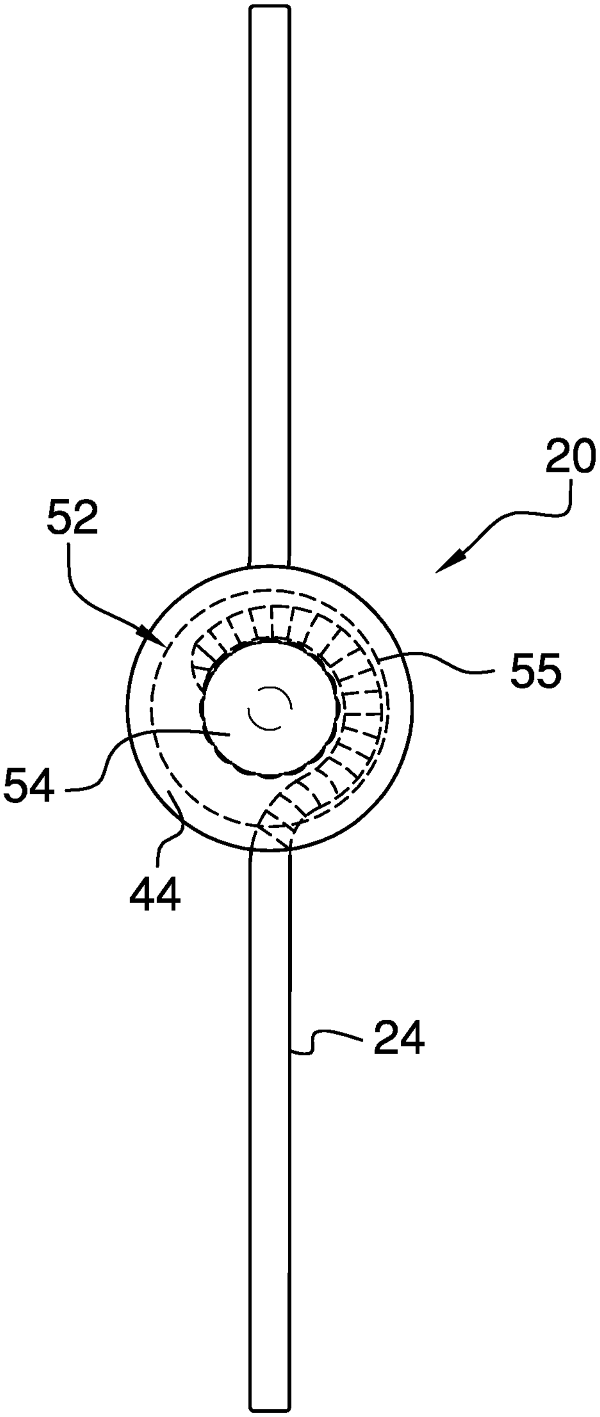
FIG. 3 is a bottom view of an embodiment of the disclosure.
Figure 4:
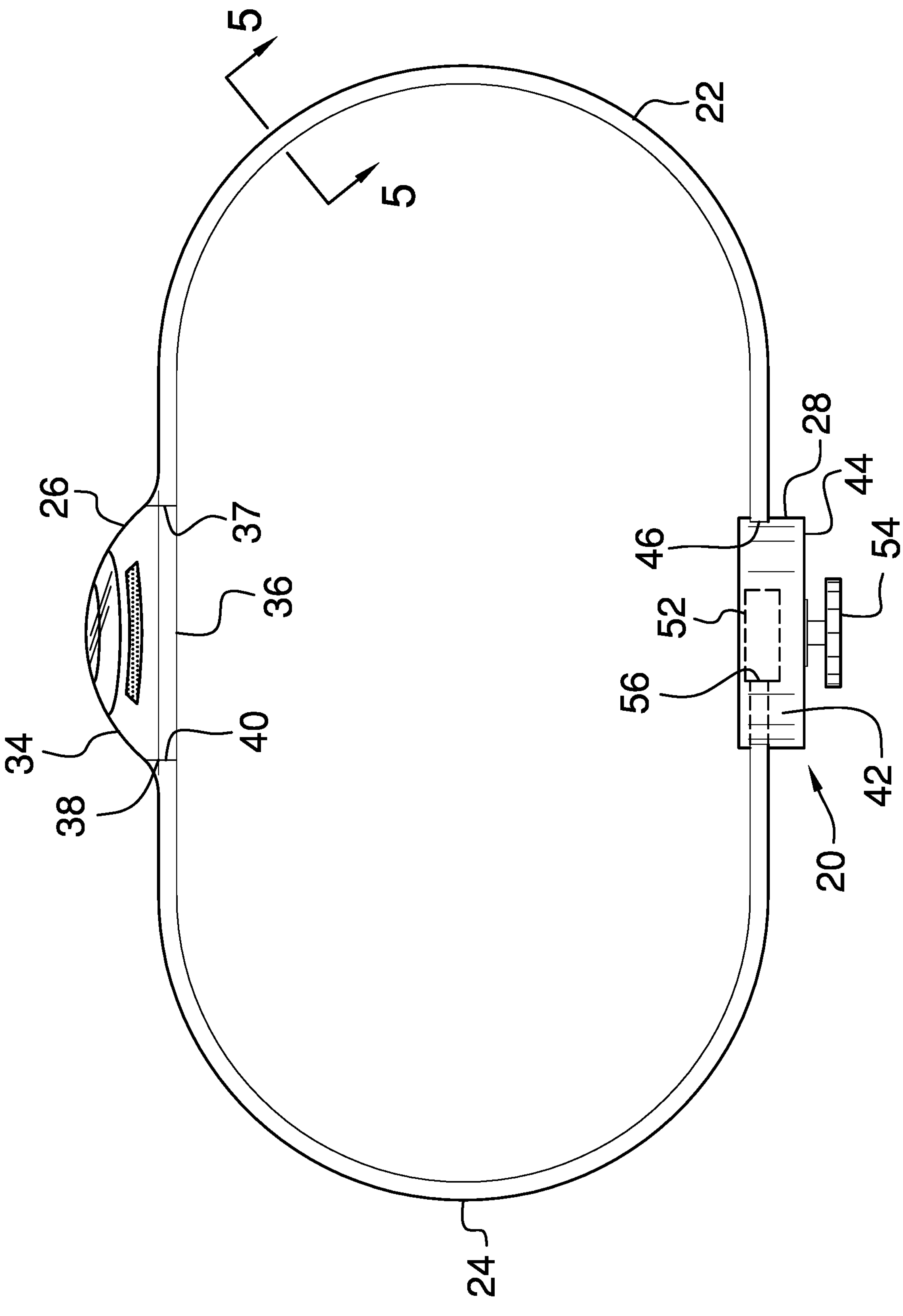
FIG. 4 is a front view of an embodiment of the disclosure.
Figure 5:
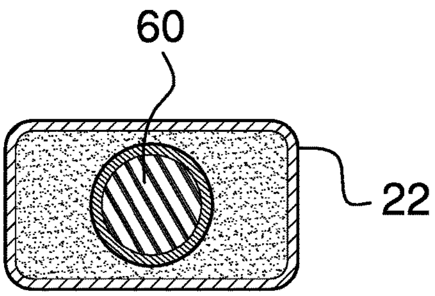
FIG. 5 is a cross sectional view taken along line 5-5 of FIG. 4 of an embodiment of the disclosure.
Figure 6:
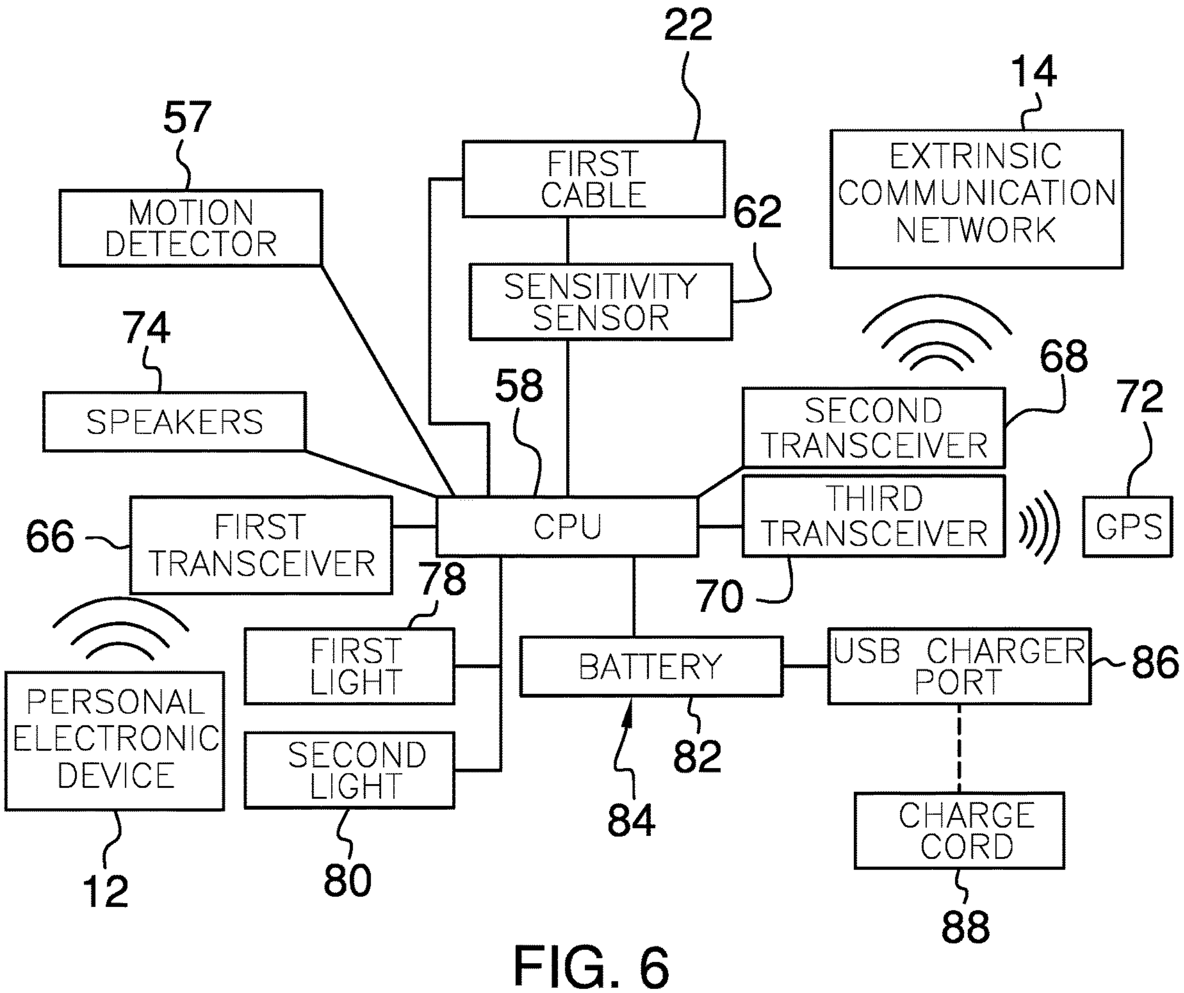
FIG. 6 is a schematic view of an embodiment of the disclosure.
Figure 7:
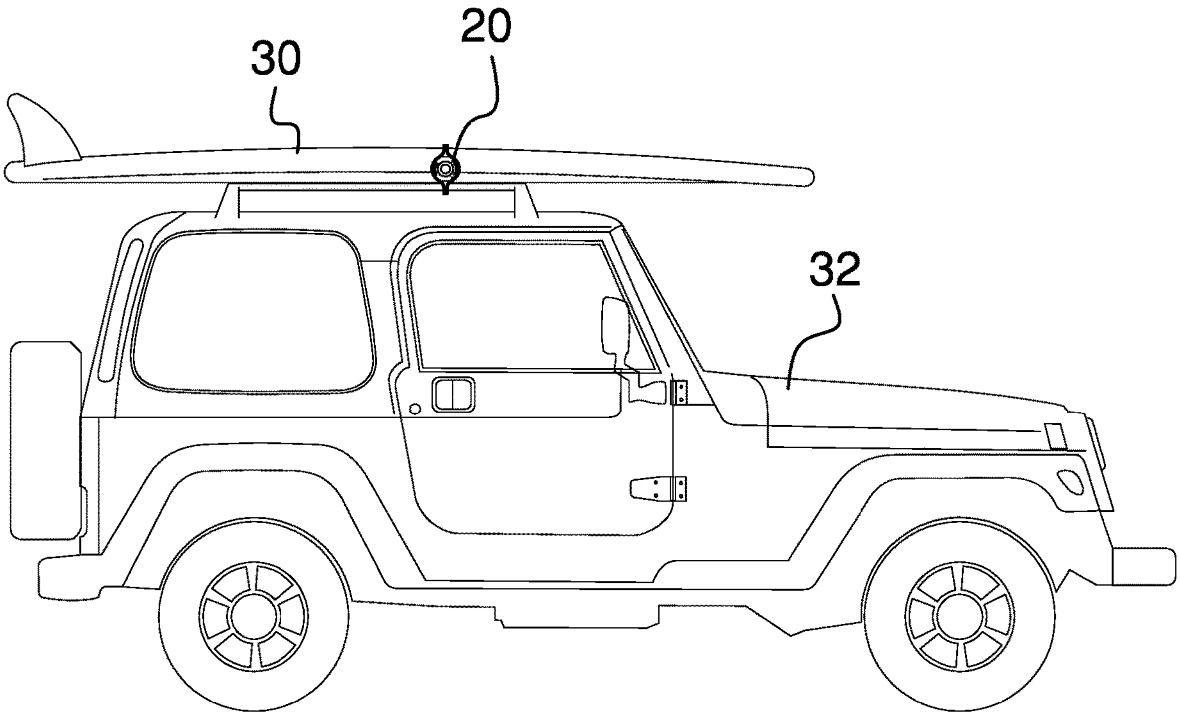
FIG. 7 is a perspective in-use view of an embodiment of the disclosure.

With reference now to the drawings, and in particular to FIGS. 1 through 10 thereof, a new theft alarm device embodying the principles and concepts of an embodiment of the disclosure and generally designated by the reference numeral 10 will be described.

As best illustrated in FIGS. 1 through 10, the theft alarm locking unit device 10 generally comprises a personal electronic device 12 that is in wireless communication with an extrinsic communication network 14. The personal electronic device 12 has data storage which stores digital data comprising a control program 16. The personal electronic device 12 may comprise a smart phone or the like and the extrinsic communication network 14 may comprise the internet, a cellular phone network or any other type of wireless communication network. Furthermore, the control program 16 may comprise a smart phone application which can be controlled by an owner 18 of the personal electronic device 12.

A locking unit 20 is provided which includes a first cable 22 and a second cable 24 that are each attached to a housing 26 and a lock 28 that is attached to the first cable 22. The second cable 24 is releasably attachable to the lock 28 such that the locking unit 20 forms a closed loop. In this way the locking unit 20 can be secured around a personal belonging 30 and an immovable structure 32 thereby protecting the personal belonging 30 from theft. The personal belonging 30 may comprise a kayak or a bicycle, for example, and the immovable structure 32 may be a cargo rack on a vehicle, for example. Additionally, the personal belonging 30 may be any valuable object that is commonly stored outdoors and the immovable structure 32 may be any object that is typically too heavy to be moved by an individual or that is permanently fixed in place.

The housing 26 has a top wall 34, a bottom wall 36 and a perimeter wall 38 extending between the top wall 34 and the bottom wall 36. The top wall 34 curves upwardly from the perimeter wall 38 such that the housing 26 has a dome shape. A first end 37 of the first cable 22 is attached to the perimeter wall 38 and the first cable 22 is flared adjacent to the first end 37 of the first cable 22. A first end 40 of the second cable 24 is attached to the perimeter wall 38 located on an opposite side of the perimeter wall 38 with respect to the first cable 22; the second cable 24 is flared adjacent to the first end 40 of the second cable 24. The lock 28 has an exterior wall 42 and a bottom wall 44 and a second end 46 of the first cable 22 is attached to the exterior wall 42. The lock 28 has a lock well 48 extending into the exterior wall 42 and the lock well 48 is positioned on an opposing side of the exterior wall 42 with respect to the second end 46 of the first cable 22. A second end 50 of the second cable 24 is insertable into the lock well 48 in the exterior wall 42 such that the first cable 22 and the second cable 24 forms a closed loop with the housing 26 and the lock 28.

The locking unit 20 includes a locking mechanism 52 that is disposed within the lock 28. The locking mechanism 52 normally is in a locking condition to releasably engage the second end 50 of the second cable 24 when the second end 50 of the second cable 24 is inserted into the lock well 48. In this way the second end 50 of the second cable 24 is attached to the lock 28. Conversely, the locking mechanism 52 is actuatable into an unlocking condition to disengage the second end 50 of the second cable 24 thereby facilitating the second end 50 of the second cable 24 to be removed from the lock well 48.

The locking mechanism 52 may comprise a magnetic lock that magnetically engages a contact that is disposed on the second end 50 of the second cable 24 or other type of device that grips the second cable 24 with sufficient force to inhibit the second cable 24 from being removed from the locking mechanism 52. The locking unit 20 includes a knob 54 extending away from the bottom wall 36 of the lock 28 thereby facilitating the knob 54 to be manipulated. The knob 54 is in mechanical communication with the locking mechanism 52 and the locking mechanism 52 is actuated into the unlocking condition when the knob 54 is rotated in a first direction. As is most clearly shown in FIG. 3, the locking unit 20 includes a tensioning mechanism 53 that is in mechanical communication with the knob 54. The tensioning unit 53 shortens the length of the second cable 24 when the knob 54 is rotated in a second direction and when the second end 50 of the second cable 24 is engaged to the locking mechanism 52. In this way the total diameter defined by the first cable 22 and the second cable 24 can be reduced to tighten the first cable 22 and the second cable 24 around the personal belonging 30 and the immovable structure 32. The tensioning mechanism 52 may comprise a spool 55 around which the second cable 24 is wrapped when the knob 54 is rotated in the second direction. Additionally, the spool 55 may freely rotate when the knob 54 is rotated in the first direction to facilitate the second cable 24 to be removed from the locking mechanism 52.

An alarm unit 56 is integrated into the housing 26 and the alarm unit 56 is in communication with the first cable 22. The alarm unit 56 is in communication with the second cable 24 when the second cable 24 is releasably attached to the lock 28. The alarm unit 56 is triggered to emit an audible alarm when the second cable 24 is forcibly removed from the lock 28. In this way the alarm unit 56 can audibly alert an owner 18 that the personal belonging 30 is in danger of being stolen. The alarm unit 56 is in remote communication with the personal electronic device 12 thereby facilitating the personal electronic device 12 to receive an alert from the alarm unit 56 when the alarm unit 56 is triggered to emit the audible alarm. In this way the personal electronic device 12 can notify the owner 18 of the potential theft when the owner 18 is not near the alarm unit 56.

A motion detector 57 is integrated into the top wall 34 of the housing 26 thereby facilitating the motion detector 57 to detect motion near the housing 26. The motion detector 57 may have an operational range which may range between approximately 1.0 meters and 3.0 meters. Additionally, the motion detector 57 may comprise an infra-red motion detector or other type of electronic motion detector that has an appropriate operational range. The alarm unit 56 is in communication with the motion detector 57 and the alarm unit 56 is triggered to emit the audible alarm when the motion detector 57 detects motion near the housing 26. Furthermore, the personal electronic device 12 receives the alert from the alarm unit 56 when the motion detector 57 detects motion. In this way the personal electronic device 12 can notify the owner 18 that an individual has approached the personal belonging 30 to facilitate the owner 18 to respond to a potential theft or act of vandalism.

The alarm unit 56 comprises a processor 58 that is positioned in the housing 26. The processor 58 receives a locking input, an unlocking input and an alarm input. Additionally, the locking mechanism 52 is electrically coupled to the processor 58 and the motion detector 57 is electrically coupled to the processor 58. The alarm unit 56 includes a first conductor 60 that is integrated into the first cable 22 and the first conductor 60 extends through the first end 37 of the first cable 22 into the housing 26 thereby facilitating the first conductor 60 to be electrically coupled to the processor 58. Additionally, the first conductor 60 is comprised of an electrically conductive material and the first conductor 60 is in electrical communication with the locking mechanism 52. The locking mechanism 52 has a force sensor 62 that detects when the first cable 22 is being tugged upon or is being exposed to excessive force that could potentially result from an attempted theft. The processor 58 receives the alarm input when the force sensor 62 senses force that is greater than a pre-determined allowable force. In this way the owner 18 can be notified that the locking unit 20 has potentially been tampered with so the owner 18 can verify that the personal belonging 30 is still secure. Additionally, the processor 58 receives the alarm input when the motion detector 57 detects motion thereby facilitating the owner 18 to be notified that an individual has moved within the sensitivity range of the motion detector 57 with the possible intention of performing a theft or an act of vandalism.

The alarm unit 56 includes a second conductor 64 that is integrated into the second cable 24. The second conductor 64 extends through the first end of the second cable 24 and into the housing 26 thereby facilitating the second conductor 64 to be electrically coupled to the processor 58. The second conductor 64 is in electrical communication with the locking mechanism 52 when the second end of the second cable 24 is engaged to the locking mechanism 52. Furthermore, the second conductor 64 forms a closed alarm circuit with the processor 58 and the first conductor 60 when the second end of the second cable 24 is engaged to the locking mechanism 52. The processor 58 receives the locking input when the closed alarm circuit is formed. The locking mechanism 52 is actuated into the unlocking condition when the processor 58 receives the unlocking input thereby facilitating the second end 50 of the second cable 24 to be removed from the lock well 48. Additionally, the processor 58 receives the alarm input when the closed alarm circuit is broken while the locking mechanism 52 is in the locking condition.

The alarm unit 56 includes a first transceiver 66 that is positioned in the housing 26 and the first transceiver 66 is electrically coupled to the processor 58. The first transceiver 66 is in wireless communication with the personal electronic device 12 and the first transceiver 66 receives operational commands from the control program 16 in the personal electronic device 12 which are subsequently communicated to the processor 58 for controlling operational parameters of the locking mechanism 52. Furthermore, the processor 58 receives the unlocking input when the first transceiver 66 receives an unlocking unit 20 command from the control program 16. The first transceiver 66 broadcasts an alert to the personal electronic device 12 when the processor 58 receives the alarm input. In this way the control program 16 in the personal electronic device 12 is facilitated to alert the owner 18 of the potential theft. The first transceiver 66 may comprise a radio frequency transceiver or the like and the first transceiver 66 may employ Bluetooth communication protocols.

The alarm unit 56 includes a second transceiver 68 that is positioned in the housing 26 and the second transceiver 68 is electrically coupled to the processor 58. The second transceiver 68 is in wireless communication with the extrinsic communication network 14 thereby facilitating the alarm unit 56 to communicate with the personal electronic device 12 when the alarm unit 56 is located beyond an effective range of the first transceiver 66. The second transceiver 68 receives operational commands from the control program 16 in the personal electronic device 12 which are subsequently communicated to the processor 58 for controlling operational parameters of the locking mechanism 52. The processor 58 receives the unlocking input when the second transceiver 68 receives an unlock command from the control program 16. The second transceiver 68 broadcasts an alert to the personal electronic device 12 when the processor 58 receives the alarm input. In this way the control program 16 in the personal electronic device 12 can alert the owner 18 of the potential theft. The second transceiver 68 may comprise a radio frequency transceiver or the like and the second transceiver 68 may employ a WPAN signal or the like to facilitate the second transceiver 68 to communicate with a public communication network.

The alarm unit 56 includes a third transceiver 70 that is positioned in the housing 26 and the third transceiver 70 is electrically coupled to the processor 58. The third transceiver 70 is in wireless communication with a global positioning system 72 thereby facilitating the third transceiver 70 to receive the physical location of the alarm unit 56 from the global positioning system 72. The third transceiver 70 is in wireless communication with the extrinsic communication network 14 to facilitate the owner 18 to track the location of the alarm unit 56 in the event of a theft. The third transceiver 70 may comprise a radio frequency transceiver or the like.

The alarm unit 56 includes a plurality of speakers 74 and each of the plurality of speakers 74 is integrated into the top wall 34 of the housing 26. Each of the plurality of speakers 74 emits an audible alarm outwardly from the top wall 34 when the plurality of speakers 74 is turned on. Each of the plurality of speakers 74 is electrically coupled to the processor 58 and each of the plurality of speakers 74 is turned on when the processor 58 receives the alarm input. Additionally, each of the speakers 74 may comprise an electronic speaker or the like and each of the speakers 74 includes a protective grill 76 that is integrated into the top wall 34 of the housing 26 to protect the speakers 74 from impact damage.

The alarm unit 56 includes a first light 78 that is integrated into the top wall 34 of the housing 26 and the first light 78 emits light outwardly from the top wall 34 thereby visually alerting the owner 18. The first light 78 is electrically coupled to the processor 58 and the first light 78 is turned on when the processor 58 receives the alarm input. Additionally, the first light 78 is centrally located on the top wall 34 and the first light 78 may comprise a light emitting diode or the like and the first light 78 emits light of a first color. A second light 80 is integrated into the top wall 34 of the housing 26 to emit light outwardly from the top wall 34 thereby visually alerting the owner 18. The second light 80 is continuous such that the second light 80 surrounds the first light 78. Additionally, the second light 80 is electrically coupled to the processor 58 and the second light 80 is turned on when the processor 58 receives the alarm input. The second light 80 may comprise a light emitting diode or the like and the second light 80 emits light of a second color. Furthermore, each of the first light 78 and the second light 80 can be actuated to either flash on and off or to be continuously on.

The alarm unit 56 includes a power supply 82 that is integrated into the housing 26 and the power supply 82 is electrically coupled to the processor 58. The power supply 82 comprises a rechargeable battery 84 that is positioned within the housing 26 and the rechargeable battery 84 is electrically coupled to the processor 58. The power supply 82 includes a charge port 86 that is recessed into the perimeter wall 38 of the housing 26 thereby facilitating the charge port 86 to insertably receive a charge cord 88. Additionally, the charge port 86 is electrically coupled to the rechargeable battery 84 for charging the rechargeable battery 84.

Figure 8:
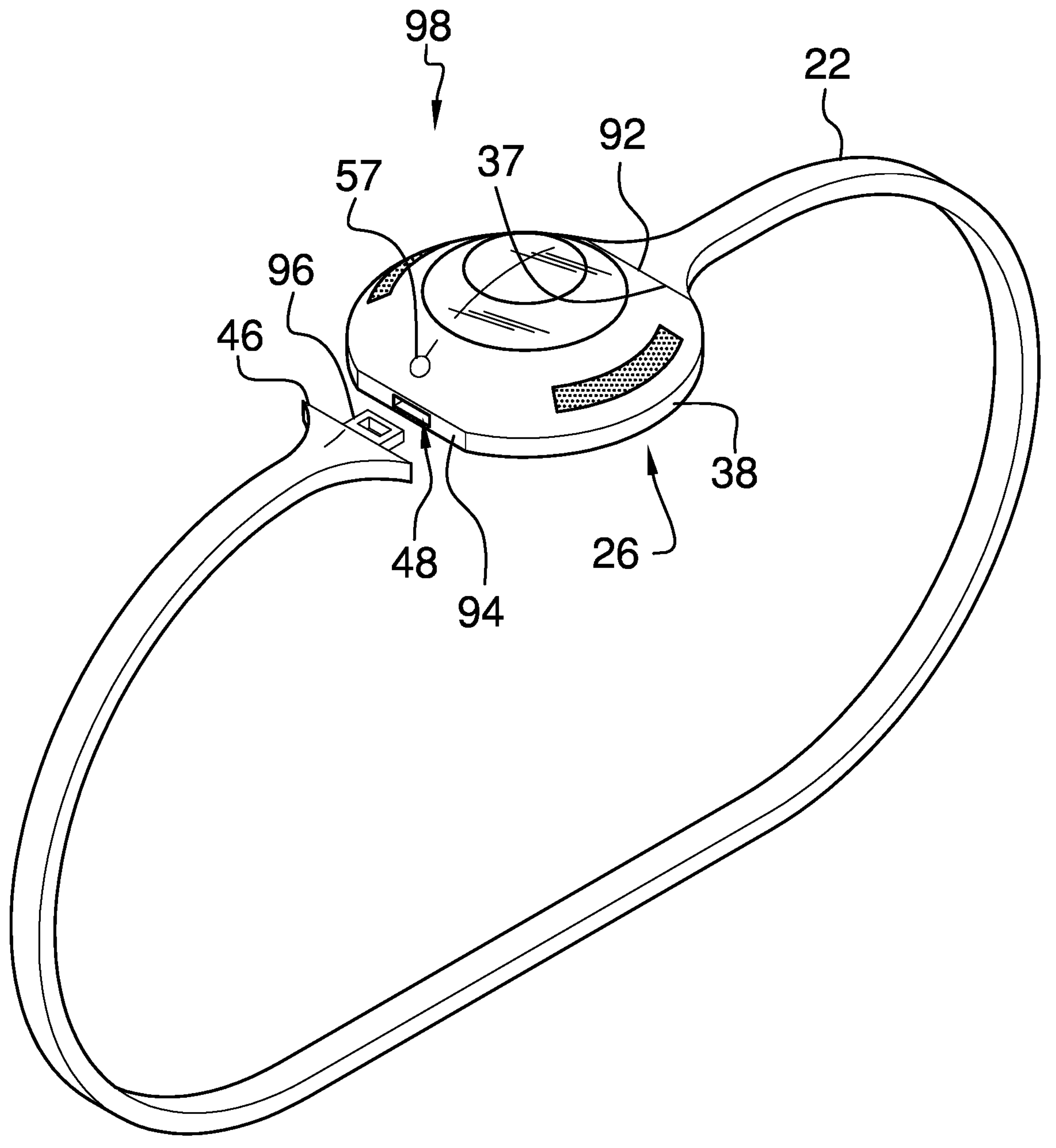
FIG. 8 is a perspective view of an alternative embodiment of the disclosure.

In an alternative embodiment 90 shown in FIG. 8, the perimeter wall 38 of the housing 26 has a first planar portion 92 and a second planar portion 94 each positioned on opposite sides of the perimeter wall 38 with respect to each other. The first end 37 of the first cable 22 is attached to the first planar portion, the lock well 48 extends into the second planar portion 94 and the locking mechanism 52 is positioned within the housing 26. The first cable 22 has a tab 96 extending away from the second end 46 of the first cable 22. Furthermore, the tab 86 is insertable into the lock well 48 thereby facilitating the locking mechanism 52 to engage the tab 96 for releasably attaching the second end 46 of the first cable 22 to the second planar portion 94.

Figure 9:
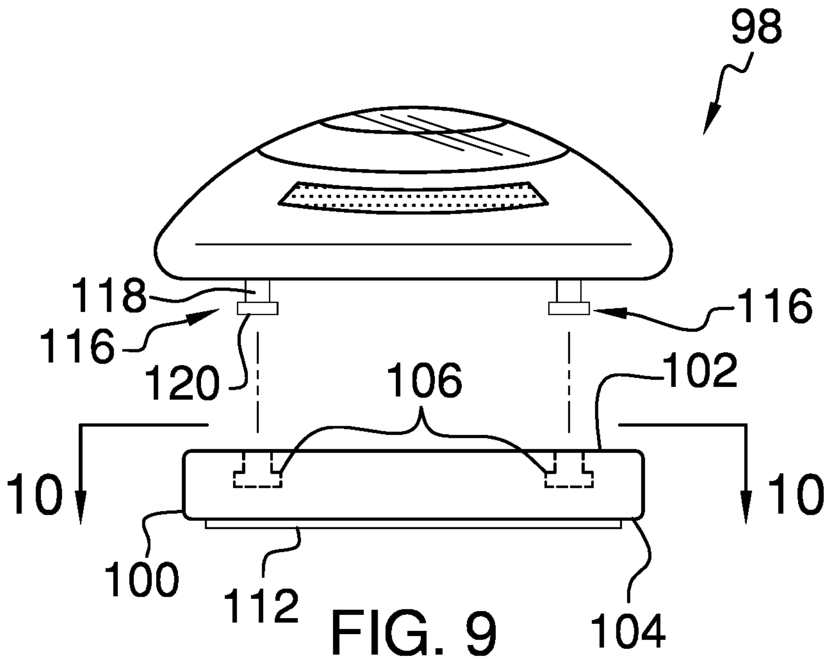
FIG. 9 is an exploded perspective view of an alternative embodiment of the disclosure.
Figure 10:
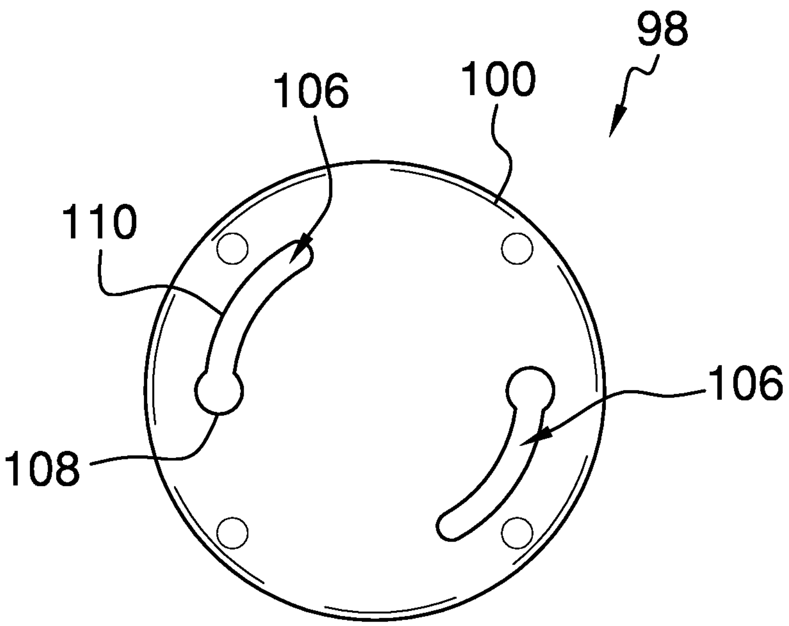
FIG. 10 is a top view of an alternative embodiment of the disclosure.

In an alternative embodiment 98 shown in FIGS. 9 and 10, a mounting disk 100 is provided which has a top surface 102 and a bottom surface 104 and the mounting disk 100 has a pair of locking slots 106 each extending into the top surface 102. Each of the pair of locking slots 106 is curved along an elongated axis and each of the pair of locking slots 106 has a rounded portion 108 and an elongated portion 110. An adhesive layer 112 is applied to the bottom surface 104 adhere to an object 114 for retaining the mounting disk 100 on the object 114. The object 114 may be a frame of a trailer, a vehicle or other large object that would be impractical to secure to the immovable structure 32.

Continuing in the alternative embodiment 98, a pair of pins 116 each extends downwardly from the bottom wall 36 of the housing 26 associated with the locking unit 20. Each of the pins 116 has a stem 118 and a head 120 and the head 120 of each of the pins 116 is insertable through the rounded portion 108 of a respective one of the locking slots 106 in the top surface 102 of the mounting disk 100. The housing 26 is rotatable on the mounting disk 100 such that each of the pins 116 travels into the elongated portion 110 of the respective locking slot 106 for retaining the housing 26 on the mounting disk 100. In this way the object 114 can be tracked with the third transceiver 70 in the event that the object 114 is stolen.

In use, the first cable 22 and second cable 24 are wrapped around the personal belonging 30 and the immovable structure 32 and the second end 50 of the first cable 24 is inserted into the lock well 48 to lock 28 the personal belonging 30 to the immovable structure 32. In this way the personal belonging 30 is locked to the immovable structure 32. The personal electronic device 12 can either be synced with the first transceiver 66 or the personal electronic device 12 can communicate with the second transceiver 68 via the extrinsic communication network 14, depending on the owner's 18 preference. The control program 16 stored in the personal electronic device 12 facilitates the owner 18 to customize operational parameters of the locking unit 20, including but not being limited to, arming or disarming the alarm unit 56, adjusting the pre-determined allowable force that triggers the force sensor 62 in the locking mechanism 52 and choosing the color of light emitted by the first light 78 and the second light 80 and whether the first light 78 and second light 80 flash or remain illuminated. The speakers 74 emit the audible alarm and the first light 78 and the second light 80 are turned on and the personal electronic device 12 emits the alert when the first cable 22 is forcibly removed from the locking unit 20. In this way the owner 18 is notified that the personal belonging 30 has potentially been stolen.

Additionally, the control program 16 stored in the personal electronic device 12 facilitates the owner 18 to customize the function of the alarm unit 56 to operate in a warning condition when the alarm unit is triggered by the motion detector 57. The speakers 74 can be actuated to emit a series of brief audible alarms and each of the first light 78 and the second light 80 can be actuated to alternatively flash on and off when the alarm unit 56 operates in the warning condition. The control program 16 further facilitates the owner 18 to set the number of times the alarm unit 56 operates in the warning condition. For example, the speakers 74 might be actuated to repeatedly emit the series of brief audible alarms a selected number of times over a selected duration of time that is selected in the control program 16. Additionally, the control program 16 can customize the function of the alarm unit 56 to facilitate the speakers 74 and the first light 78 and the second light 80 to be actuated in the same manner as when alarm unit 56 is triggered by the force sensor 62 when the alarm unit 56 operates in the warning condition for a duration of time that exceeds to duration of time selected in the control program 16.

With respect to the above description then, it is to be realized that the optimum dimensional relationships for the parts of an embodiment enabled by the disclosure, to include variations in size, materials, shape, form, function and manner of operation, device and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A theft alarm locking unit device for securing a personal belonging and notifying an owner in the event of a theft, said device comprising:

a personal electronic device being in wireless communication with an extrinsic communication network, said personal electronic device having data storage which stores digital data comprising a control program;

a locking unit comprising a first cable and a second cable each being attached to a housing and a lock being attached to said first cable, said second cable being releasably attachable to said lock such that said locking unit forms a closed loop wherein said locking unit is configured to be secured around a personal belonging and an immovable structure thereby protecting the personal belonging from theft;

a motion detector being integrated into said housing wherein said motion detector is configured to detect motion near said housing;

an alarm unit being integrated into said housing, said alarm unit being in communication with said first cable, said alarm unit being in communication with said second cable when said second cable is releasably attached to said lock, said alarm unit being triggered to emit an audible alarm when said second cable is forcibly removed from said lock wherein said alarm unit is configured to audibly alert an owner that the personal belonging is in danger of being stolen, said alarm unit being in communication with said motion detector, said alarm unit being triggered to emit said audible alarm when said motion detector detects motion near said housing, said alarm unit being in remote communication with said personal electronic device thereby facilitating said personal electronic device to receive an alert from said alarm unit when said alarm unit is triggered to emit said audible alarm wherein said personal electronic device is configured to notify the owner of the potential theft when the owner is not near said alarm unit;

wherein said housing has a top wall and a bottom wall and a perimeter wall extending between said top wall and said bottom wall, said top wall curving upwardly from said perimeter wall such that said housing has a dome shape;

wherein a first end of said first cable is attached to said perimeter wall;

wherein said first cable is flared adjacent to said first end of said first cable;

wherein a first end of said second cable is attached to said perimeter wall located on an opposite side of said perimeter wall with respect to said first cable;

wherein said second cable is flared adjacent to said first end of said second cable;

wherein said lock has an exterior wall and a bottom wall; and wherein a second end of said first cable is attached to said exterior wall.

2. The device according to claim 1, wherein:

said lock has a lock well extending into said exterior wall;

said lock well is positioned on an opposing side of said exterior wall with respect to said second end of said first cable; and a second end of said second cable is insertable into said lock well in said exterior wall such that said first cable and said second cable forms a closed loop with said housing and said lock.

3. The device according to claim 2, wherein:

said locking unit includes a locking mechanism being disposed within said lock;

said locking mechanism is normally in a locking condition to releasably engage said second end of said second cable when said second end of said second cable is inserted into said lock well thereby attaching said second end of said second cable to said lock; and said locking mechanism is actuatable into an unlocking condition to disengage said second end of said second cable thereby facilitating said second end of said second cable to be removed from said lock well.

4. The device according to claim 3, wherein said locking unit includes a knob extending away from said bottom wall of said lock thereby facilitating said knob to be manipulated, said knob being in mechanical communication with said locking mechanism, said locking mechanism being actuated into said unlocking condition when said knob is rotated in a first direction.

5. The device according to claim 3, wherein said alarm unit comprises:

a processor being positioned in said housing, said processor receiving a locking unit input, said processor receiving an unlocking unit input, said processor receiving an alarm input, said locking mechanism being electrically coupled to said processor;

a first conductor being integrated into said first cable, said first conductor extending through said first end of said first cable into said housing thereby facilitating said first conductor to be electrically coupled to said processor, said first conductor being in electrical communication with said locking mechanism; and a second conductor being integrated into said second cable, said second conductor extending through said first end of said second cable and into said housing thereby facilitating said second conductor to be electrically coupled to said processor, said second conductor being in electrical communication with said locking mechanism when said second end of said second cable is engaged to said locking mechanism such that said second conductor forms a closed alarm circuit with said processor and said first conductor when said second end of said second cable is engaged to said locking mechanism.

6. The device according to claim 5, wherein:

said processor receives said locking unit input when said closed alarm circuit is formed;

said locking mechanism is actuated into said unlocking condition when said processor receives said unlocking unit input thereby facilitating said second end of said second cable to be removed from said lock well; and said processor receiving said alarm input when said closed alarm circuit is broken while said locking mechanism is in said locking united condition.

7. The device according to claim 5, wherein:

said alarm unit includes a first transceiver being positioned in said housing;

said first transceiver is electrically coupled to said processor;

said first transceiver is in wireless communication with said personal electronic device;

said first transceiver receives operational commands from said control program in said personal electronic device which are subsequently communicated to said processor for controlling operational parameters of said locking mechanism;

said processor receives said unlocking unit input when said first transceiver receives an unlocking unit command from said control program; and said first transceiver broadcasts an alert to said personal electronic device when said processor receives said alarm input wherein said control program in said personal electronic device is configured to alert the owner of the potential theft.

8. The device according to claim 5, wherein:

said alarm unit includes a first transceiver and a second transceiver each being positioned in said housing;

said second transceiver is electrically coupled to said processor;

said second transceiver is in wireless communication with said extrinsic communication network thereby facilitating said alarm unit to communicate with said personal electronic device when said alarm unit is located beyond an effective range of said first transceiver;

said second transceiver receives operational commands from said control program in said personal electronic device which are subsequently communicated to said processor for controlling operational parameters of said locking mechanism;

said processor receives said unlocking unit input when said second transceiver receives an unlocking unit command from said control program; and said second transceiver broadcasts an alert to said personal electronic device when said processor receives said alarm input wherein said control program in said personal electronic device is configured to alert the owner of the potential theft.

9. The device according to claim 5, wherein:

said alarm unit includes a first transceiver and a second transceiver and a third transceiver each being positioned in said housing;

said third transceiver is electrically coupled to said processor;

said third transceiver is in wireless communication with a global positioning system thereby facilitating said third transceiver to receive the physical location of said alarm unit from said global positioning system; and said third transceiver is in wireless communication with said extrinsic communication network wherein said third transceiver is configured to facilitate the owner to track the location of said alarm unit in the event of a theft.

10. The device according to claim 5, wherein said alarm unit includes a plurality of speakers, each of said plurality of speakers being integrated into said top wall of said housing wherein each of said plurality of speakers is configured to emit an audible alarm outwardly from said top wall when said plurality of speakers is turned on, each of said plurality of speakers being electrically coupled to said processor, each of said plurality of speakers being turned on when said processor receives said alarm input.

11. The device according to claim 5, wherein said alarm unit includes a first light being integrated into said top wall of said housing wherein said first light is configured to emit light outwardly from said top wall thereby visually alerting the owner, said first light being electrically coupled to said processor, said first light being turned on when said processor receives said alarm input, said first light being centrally located on said top wall.

12. The device according to claim 11, wherein said alarm unit includes a second light being integrated into said top wall of said housing wherein said second light is configured to emit light outwardly from said top wall thereby visually alerting the owner, said second light being continuous such that said second light surrounds said first light, said second light being electrically coupled to said processor, said second light being turned on when said processor receives said alarm input.

13. The device according to claim 5, further comprising a power supply being integrated into said housing, said power supply being electrically coupled to said processor, said power supply comprising:

a rechargeable battery being positioned within said housing, said rechargeable battery being electrically coupled to said processor; and a charge port being recessed into said perimeter wall of said housing thereby facilitating said charge port to insertably receive a charge cord, said charge port being electrically coupled to said rechargeable battery for charging said rechargeable battery.

14. A theft alarm locking unit device for securing a personal belonging and notifying an owner in the event of a theft, said device comprising:

a personal electronic device being in wireless communication with an extrinsic communication network, said personal electronic device having data storage which stores digital data comprising a control program;

a locking unit comprising a first cable and a second cable each being attached to a housing and a lock being attached to said first cable, said second cable being releasably attachable to said lock such that said locking unit forms a closed loop wherein said locking unit is configured to be secured around a personal belonging and an immovable structure thereby protecting the personal belonging from theft, said housing having a top wall and a bottom wall and a perimeter wall extending between said top wall and said bottom wall, said top wall curving upwardly from said perimeter wall such that said housing has a dome shape, a first end of said first cable being attached to said perimeter wall, said first cable being flared adjacent to said first end of said first cable, a first end of said second cable being attached to said perimeter wall located on an opposite side of said perimeter wall with respect to said first cable, said second cable being flared adjacent to said first end of said second cable, said lock having an exterior wall and a bottom wall, a second end of said first cable being attached to said exterior wall, said lock having a lock well extending into said exterior wall, said lock well being positioned on an opposing side of said exterior wall with respect to said second end of said first cable, a second end of said second cable being insertable into said lock well in said exterior wall such that said first cable and said second cable forms a closed loop with said housing and said lock, said locking unit including a locking mechanism being disposed within said lock, said locking mechanism normally being in a locking condition to releasably engage said second end of said second cable when said second end of said second cable is inserted into said lock well thereby attaching said second end of said second cable to said lock, said locking mechanism being actuatable into an unlocking condition to disengage said second end of said second cable thereby facilitating said second end of said second cable to be removed from said lock well, said locking unit including a knob extending away from said bottom wall of said lock thereby facilitating said knob to be manipulated, said knob being in mechanical communication with said locking mechanism, said locking mechanism being actuated into said unlocking condition when said knob is rotated in a first direction;

a motion detector being integrated into said housing wherein said motion detector is configured to detect motion near said housing;

an alarm unit being integrated into said housing, said alarm unit being in communication with said first cable, said alarm unit being in communication with said second cable when said second cable is releasably attached to said lock, said alarm unit being triggered to emit an audible alarm when said second cable is forcibly removed from said lock wherein said alarm unit is configured to audibly alert an owner that the personal belonging is in danger of being stolen, said alarm unit being in communication with said motion detector, said alarm unit being triggered to emit said audible alarm when said motion detector detects motion near said housing, said alarm unit being in remote communication with said personal electronic device thereby facilitating said personal electronic device to receive an alert from said alarm unit when said alarm unit is triggered to emit said audible alarm wherein said personal electronic device is configured to notify the owner of the potential theft when the owner is not near said alarm unit, said alarm unit comprising:

a processor being positioned in said housing, said processor receiving a locking unit input, said processor receiving an unlocking unit input, said processor receiving an alarm input, said locking mechanism being electrically coupled to said processor, said motion detector being electrically coupled to said motion detector, said processor receiving said alarm input when said motion detector detects motion near said housing;

a first conductor being integrated into said first cable, said first conductor extending through said first end of said first cable into said housing thereby facilitating said first conductor to be electrically coupled to said processor, said first conductor being in electrical communication with said locking mechanism;

a second conductor being integrated into said second cable, said second conductor extending through said first end of said second cable and into said housing thereby facilitating said second conductor to be electrically coupled to said processor, said second conductor being in electrical communication with said locking mechanism when said second end of said second cable is engaged to said locking mechanism such that said second conductor forms a closed alarm circuit with said processor and said first conductor when said second end of said second cable is engaged to said locking mechanism, said processor receiving said locking unit input when said closed alarm circuit is formed, said locking mechanism being actuated into said unlocking condition when said processor receives said unlocking unit input thereby facilitating said second end of said second cable to be removed from said lock well, said processor receiving said alarm input when said closed alarm circuit is broken while said locking mechanism is in said locking united condition;

a first transceiver being positioned in said housing, said first transceiver being electrically coupled to said processor, said first transceiver being in wireless communication with said personal electronic device, said first transceiver receiving operational commands from said control program in said personal electronic device which are subsequently communicated to said processor for controlling operational parameters of said locking mechanism, said processor receiving said unlocking unit input when said first transceiver receives an unlocking unit command from said control program, said first transceiver broadcasting an alert to said personal electronic device when said processor receives said alarm input wherein said control program in said personal electronic device is configured to alert the owner of the potential theft;

a second transceiver being positioned in said housing, said second transceiver being electrically coupled to said processor, said second transceiver being in wireless communication with said extrinsic communication network thereby facilitating said alarm unit to communicate with said personal electronic device when said alarm unit is located beyond an effective range of said first transceiver, said second transceiver receiving operational commands from said control program in said personal electronic device which are subsequently communicated to said processor for controlling operational parameters of said locking mechanism, said processor receiving said unlocking unit input when said second transceiver receives an unlocking unit command from said control program, said second transceiver broadcasting an alert to said personal electronic device when said processor receives said alarm input wherein said control program in said personal electronic device is configured to alert the owner of the potential theft;

a third transceiver being positioned in said housing, said third transceiver being electrically coupled to said processor, said third transceiver being in wireless communication with a global positioning system thereby facilitating said third transceiver to receive the physical location of said alarm unit from said global positioning system, said third transceiver being in wireless communication with said extrinsic communication network wherein said third transceiver is configured to facilitate the owner to track the location of said alarm unit in the event of a theft;

a plurality of speakers, each of said plurality of speakers being integrated into said top wall of said housing wherein each of said plurality of speakers is configured to emit an audible alarm outwardly from said top wall when said plurality of speakers is turned on, each of said plurality of speakers being electrically coupled to said processor, each of said plurality of speakers being turned on when said processor receives said alarm input;

a first light being integrated into said top wall of said housing wherein said first light is configured to emit light outwardly from said top wall thereby visually alerting the owner, said first light being electrically coupled to said processor, said first light being turned on when said processor receives said alarm input, said first light being centrally located on said top wall;

a second light being integrated into said top wall of said housing wherein said second light is configured to emit light outwardly from said top wall thereby visually alerting the owner, said second light being continuous such that said second light surrounds said first light, said second light being electrically coupled to said processor, said second light being turned on when said processor receives said alarm input; and a power supply being integrated into said housing, said power supply being electrically coupled to said processor, said power supply comprising:

a rechargeable battery being positioned within said housing, said rechargeable battery being electrically coupled to said processor; and a charge port being recessed into said perimeter wall of said housing thereby facilitating said charge port to insertably receive a charge cord, said charge port being electrically coupled to said rechargeable battery for charging said rechargeable battery.

15. The device according to claim 14, wherein:

said perimeter wall of said housing has a first planar portion and a second planar portion each being positioned on opposite sides of said perimeter wall with respect to each other;

said first end of said first cable is attached to said first planar portion;

said lock well extends into said second planar portion;

said locking mechanism is positioned within said housing;

said first cable has a tab extending away from said second end of said first cable; and said tab is insertable into said lock well thereby facilitating said locking mechanism to engage said tab for releasably attaching said second end of said first cable to said second planar portion.

16. The device according to claim 14, further comprising:

a mounting disk having a top surface and a bottom surface, said mounting disk having a pair of locking slots each extending into said top surface, each of said pair of locking slots being curved along an elongated axis, each of said pair of locking slots having a rounded portion and an elongated portion; and an adhesive layer being applied to said bottom surface wherein said adhesive layer is configured to adhere to a support surface for retaining said mounting disk on the support surface.

17. The device according to claim 16, further comprising a pair of pins each extending downwardly from said bottom wall of said housing associated with said locking unit, each of said pins having a stem and a head, said head of each of said pins being insertable through said rounded portion of a respective one of said locking slots in said top surface of said mounting disk, said housing being rotatable on said mounting disk such that each of said pins travels into said elongated portion of said respective slot for retaining said housing on said mounting disk.

* * * * *